(12) United States Patent
Weinberg et al.

(10) Patent No.: US 11,032,178 B2
(45) Date of Patent: *Jun. 8, 2021

(54) SYSTEM AND METHOD FOR CREATING, DEPLOYING, AND ADMINISTERING DISTINCT VIRTUAL COMPUTER NETWORKS

(71) Applicants: Brian Weinberg, West Hartford, CT (US); Christopher S. Griffin, Wethersfield, CT (US)

(72) Inventors: Brian Weinberg, West Hartford, CT (US); Christopher S. Griffin, Wethersfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,907

(22) Filed: Nov. 25, 2019

(65) Prior Publication Data

US 2020/0092188 A1 Mar. 19, 2020

Related U.S. Application Data

(63) Continuation of application No. 14/208,516, filed on Mar. 13, 2014, now Pat. No. 10,541,898.

(Continued)

(51) Int. Cl.
*H04L 12/26* (2006.01)
*H04L 12/24* (2006.01)
(Continued)

(52) U.S. Cl.
CPC .......... *H04L 43/0876* (2013.01); *H04L 43/08* (2013.01); *G06F 9/45558* (2013.01);
(Continued)

(58) Field of Classification Search
CPC ..... H04L 43/0876; H04L 41/08; H04L 63/02; H04L 43/08; G06F 2009/45562;
(Continued)

(56) References Cited

U.S. PATENT DOCUMENTS 7,379,857 B2    5/2008 Piesco
8,255,907 B2    8/2012 Chiaramonte et al.
(Continued)

FOREIGN PATENT DOCUMENTS

EP    1682978 B1    7/2006

*Primary Examiner* — Hitesh Patel
*Assistant Examiner* — Clifton Houston
(74) *Attorney, Agent, or Firm* — Grogan, Tuccillo & Vanderleeden, LLP

(57) ABSTRACT

Embodiments of the invention relate to a centralized managing system and method for creating, deploying, administering, and managing a plurality of separate and distinct virtual computer networks on a virtualization platform for offering cloud computing services (SaaS). Embodiments of the invention relate to a computer system for a centralized management of separate and distinct virtual computer networks, which has a security grid which has at least one grid processor and a memory device that stores a managing application. The managing application has a virtualization platform, a grid access layer, a virtual computer network template system, a plurality of resource distribution tools and a plurality of monitoring and metering tools. The grid processor is adapted by the managing application so that it can create, deploy, administer, and manage the plurality of separate and distinct computer networks.

14 Claims, 4 Drawing Sheets

Related U.S. Application Data

(60) Provisional application No. 61/791,245, filed on Mar. 15, 2013.

(51) Int. Cl.
*G06F 9/455* (2018.01)
*H04L 29/06* (2006.01)
*H04L 29/08* (2006.01)

(52) U.S. Cl.
CPC .............. *H04L 41/08* (2013.01); *H04L 63/02* (2013.01); *H04L 67/02* (2013.01)

(58) Field of Classification Search
CPC ....... G06F 9/5072; G06F 8/60; G06F 9/45558; G06F 9/45533
See application file for complete search history.

(56) References Cited

U.S. PATENT DOCUMENTS

| | | | |
|---|---|---|---|
| 8,294,593 B2 | 10/2012 | Behrendt et al. | |
| 8,335,678 B2 | 12/2012 | Hughes et al. | |
| 8,347,355 B2 | 1/2013 | Mower et al. | |
| 8,392,608 B1 | 3/2013 | Miller et al. | |
| 8,432,832 B2* | 4/2013 | Zuk | H04L 41/085 370/254 |
| 8,671,176 B1* | 3/2014 | Kharitonov | H04L 45/02 709/223 |
| 8,838,764 B1* | 9/2014 | Johnston | H04L 43/12 709/223 |
| 9,027,077 B1* | 5/2015 | Bharali | G06F 16/00 726/1 |
| 9,137,121 B1* | 9/2015 | Sinn | H04L 41/0816 |
| 9,851,984 B2* | 12/2017 | Kennedy | G06F 9/44505 |
| 2006/0155708 A1* | 7/2006 | Brown | H04L 12/4679 |
| 2007/0043860 A1* | 2/2007 | Pabari | G06F 9/5077 709/224 |
| 2009/0044270 A1* | 2/2009 | Shelly | H04L 63/14 726/22 |
| 2009/0299920 A1 | 12/2009 | Ferris et al. | |
| 2011/0022694 A1* | 1/2011 | Dalal | H04L 41/0856 709/222 |
| 2011/0071983 A1* | 3/2011 | Murase | G06F 9/5088 707/649 |
| 2012/0072909 A1* | 3/2012 | Malik | H04L 41/0816 718/1 |
| 2012/0089666 A1* | 4/2012 | Goswami | G06Q 10/103 709/203 |
| 2012/0117181 A1* | 5/2012 | Patel | G06F 8/61 709/217 |
| 2012/0209812 A1* | 8/2012 | Bezbaruah | G06F 11/1451 707/646 |
| 2012/0260250 A1* | 10/2012 | Maeda | G06F 21/53 718/1 |
| 2012/0284405 A1 | 11/2012 | Ferris et al. | |
| 2012/0284708 A1 | 11/2012 | Anderson, III et al. | |
| 2013/0014106 A1* | 1/2013 | Imai | H04L 67/16 718/1 |
| 2013/0041987 A1* | 2/2013 | Warno | H04L 61/2514 709/220 |
| 2013/0124712 A1* | 5/2013 | Parker | H04L 41/5051 709/224 |
| 2013/0212576 A1* | 8/2013 | Huang | G06F 9/5072 718/1 |
| 2014/0010109 A1* | 1/2014 | Himura | H04L 41/0853 370/254 |
| 2014/0195666 A1* | 7/2014 | Dumitriu | H04L 49/70 709/223 |
| 2014/0196032 A1* | 7/2014 | Gupta | G06F 8/63 718/1 |
| 2014/0297871 A1* | 10/2014 | Iikura | H04L 47/125 709/226 |
| 2015/0365281 A1* | 12/2015 | Marino | H04L 45/586 709/223 |
| 2017/0054728 A1* | 2/2017 | Hadar | H04L 63/20 |

* cited by examiner

SYSTEM AND METHOD FOR CREATING, DEPLOYING, AND ADMINISTERING DISTINCT VIRTUAL COMPUTER NETWORKS

CROSS-REFERENCE TO RELATED APPLICATIONS

This application is a continuation of U.S. patent application Ser. No. 14/208,516 filed on Mar. 13, 2014 which claims priority to U.S. Provisional Application No. 61/791,245, filed on Mar. 15, 2013. All of the above-referenced applications are incorporated herein by reference in their entirety.

BACKGROUND OF THE INVENTION

The present invention is generally directed to providing software as a service (SaaS).

FIELD OF INVENTION

Private and personalized computer networks (networks) are capable of providing end users tools, which increase collaboration, communication and overall productivity. Once reserved for large entities capable of affording the expensive hardware and specialized technicians required for supporting local area networks (LANs), the advent of cloud computing, virtual machines, and grid computing, has drastically reshaped the physical infrastructure required to enable network operations. No longer should an individual entity purchase and maintain network hardware. Rather, computing resources can now be pooled through grid computing, remotely accessed through cloud computing, and sold as a service through utility computing.

Typically, a SaaS vendor offers the end user a specific application via the internet. A Web application (Web app) is an application program that is stored on a remote server and delivered over the Internet through a browser interface. SaaS web applications provide a method for businesses to minimize their dependency on traditional LANs. The current model for delivering SaaS applications introduces new concerns for businesses to consider. Several limitations of traditional SasS services include: application independency, security, shared application servers, and limited application customization.

Data in SaaS environments is often stored in the same database and separated only by user name and password controls. Should the service provider run into directory or permission problems, commingling of such information can enable unauthorized users to have access to a SaaS user/client's resources.

Application independency makes integration and information sharing, between multiple applications, difficult or impossible. A user might decide to use services provided by two, or more, different application providers. As applications are often developed independently of each other, they tend to lack a native way for sharing common data (such as a client database). Several third party developers have created tools that can extract data from one application and use that data to populate or synchronize other applications. Some application providers have developed tools to allow similar data sharing with other web applications. These tools depend on users' awareness of their existence and ability to install and configuring them. In addition, as these tools are independently managed from the applications they modify, should one application's configuration be altered, the software communication links between the tools and applications can break. The links will remain broken until the tools are rewritten to accommodate the new application configuration.

Such monolithic application servers often create a single point of failure. Should the application fail, the servers be compromised or any other catastrophic events occur, which affect the application server and users would be affected universally.

Individual user customization, for most SaaS applications, is constrained by the fact that they are served on shared machines. From the traditional SaaS provider's perspective, keeping their application as homogeneous as possible enables them to service the greatest number of customers, while minimizing the amount of maintenance required.

Monolithic SaaS services are primarily designed in this fashion in order to minimize maintenance. In addition to the factors listed above, each server used in providing the application, whether physical or virtual, requires independent maintenance, such as updating, upgrading, etc. By providing only a single application, or uniform set of services, in a monolithic fashion from a collective set of servers, SaaS providers are best able to commoditize their services to reduce management, monitoring, and maintenance costs.

It is therefore seen that there exists a need in the art to overcome the deficiencies and limitations herein and above.

SUMMARY OF THE INVENTION

Disclosed herein relates to a computer system for a centralized management of separate and distinct virtual computer networks which comprises a computer data grid comprised of at least one grid processor and a memory device that stores a managing application. The grid includes at least one grid processor and memory device. The managing application comprises a virtualization platform, a grid access security layer, a virtual computer network template system, a plurality of resource distribution tools, and a plurality of monitoring and metering tools. The at least one processor is adapted by the managing application to create, deploy, administer, and manage a plurality of separate and distinct virtual computer networks.

In one aspect, the computer system for the centralized management of separate and distinct virtual computer networks is further comprised of each separate and distinct virtual computer network of a plurality of separate and distinct virtual computer networks. Each separate and distinct virtual computer comprises a plurality of virtual network subcomponents hosted on a plurality of specially designed virtual machines.

In another aspect, the grid access security layer is comprised of an overarching firewall, and wherein a subcomponent, of a plurality of subcomponents, is an individual firewall.

In another aspect, the grid processor is further adapted by the managing application, by way of the virtual computer network template system, to group at least one virtual computer network template subcomponent template into a separate and distinct virtual network template. The at least one virtual computer network subcomponent, of the plurality of virtual network subcomponents, is based on at least one virtual computer network subcomponent template. The plurality of separate and distinct virtual networks is based at least, in part, on the separate and distinct virtual computer network template.

In another aspect, the at least one specially designed virtual machine, of the plurality of specially designed virtual machines, comprises at least one soft point and at least one hard point. The at least one specially designed virtual machine is configured to have at least one soft point stored in an isolated storage medium separate from the at least specially designed virtual machine.

In yet another aspect, the grid processor is further adapted by the managing application, by way of the virtual computer network template system, to make a subcomponent template modification to the at least one virtual computer network subcomponent template, and push the subcomponent template modification to the at least one virtual computer network subcomponent template. The at least one of the at least one hard point, of the specially designed virtual machines hosting the at least one virtual computer network subcomponent is modified.

In yet another aspect, the grid processor is further adapted by the managing application, by way of the virtual computer network template system, to make a network template modification to the virtual computer network template and push the network template modification to the virtual computer network based at least, in part, on the virtual computer network template.

In another aspect, at least one virtual computer network subcomponent is modified independently from the virtual computer network subcomponent template it is based at least in part on.

In yet another aspect, at least one separate and distinct virtual computer network is modified independently from the virtual computer network template it is based at least in part on.

Disclosed herein relates to a method for managing separate and distinct virtual computer networks comprising storing a managing application, providing a virtualization platform, providing a grid access security layer, providing a virtual computer network template system, providing a plurality of resource distribution tools, providing a plurality of monitoring and metering tools, creating a plurality of separate and distinct virtual computer networks, deploying the plurality of separate and distinct virtual computer networks, and administering the plurality of separate and distinct virtual computer networks.

Also disclosed herein relates to a non-transitory computer-readable medium having instructions stored and configured to adapt at least one grid processor to perform the method comprising storing a managing application, providing a virtualization platform, providing a grid access security layer, providing virtual computer network template system, providing a plurality of resource distribution tools, providing a plurality of monitoring and metering tools, creating a plurality of separate and distinct virtual computer networks, deploying the plurality of separate and distinct virtual computer networks, and administering the plurality of separate and distinct virtual computer networks.

The shortcomings of the prior art are overcome and additional advantages are provided through an assembly of virtual machines to create a virtual rendition of a traditional local area network. Virtual machine appliances and servers are combined to provide a user/client with a private and unique system to store files and data, serve web applications, and monitor system services. Each distinct virtual computer network includes multiple virtual servers that are integrated, in order to offer a client/user an array of SaaS applications, as opposed to traditional SaaS delivery systems. Each distinct virtual computer network also has its own unique interface, separate from all other distinct virtual business networks. Ordinarily, such a network requires completely independent management, including updating, upgrading, configuring, provisioning, maintaining, reporting, etc., from all other similar distinct virtual computer networks. This results in savings only in hardware resources, as management of these systems would otherwise be highly duplicative in nature.

Accordingly, an embodiment of the invention is comprised of software designed to be loaded into one or more computers in a computer system, such that when loaded, the software configures the computer system, so that it becomes part of a centralized managing system and method, described within this document, for creating, deploying, administering, and managing a plurality of separate and distinct virtual computer networks on a virtualization platform for offering cloud computing services (SaaS).

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

Referring to the figures, which are exemplary embodiments, and wherein the like elements are numbered alike.

DETAILED DESCRIPTION

Described herein are a centralized management system and a method which utilizes a templating system for creating, deploying, administering, and managing a plurality of separate and distinct virtual computer networks on a computer grid, in order to offer cloud-computing services (SaaS).

Figure 1:
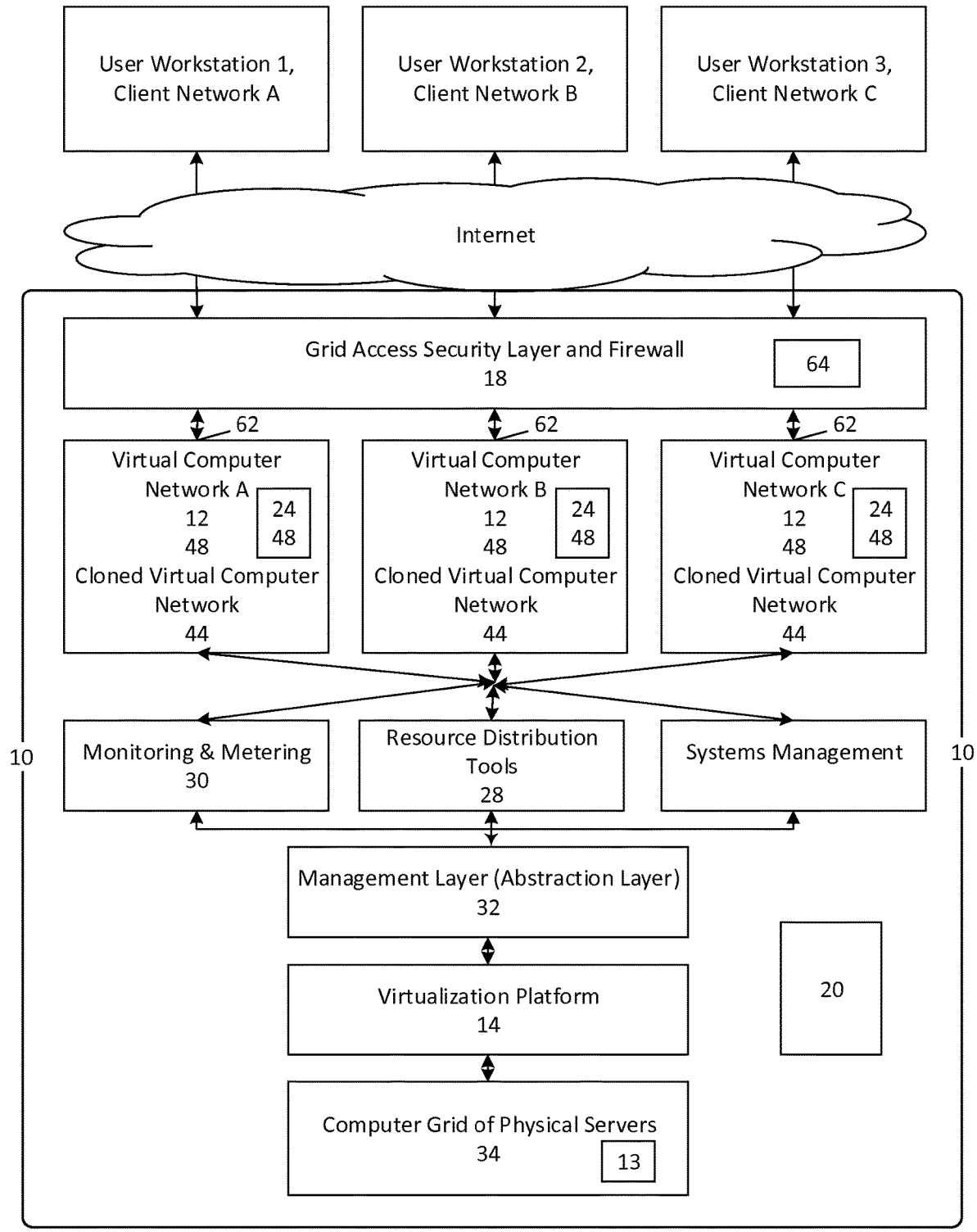
FIG. 1 illustrates a system for managing multiple virtual computer networks.

Referring to FIG. 1, embodiments of the invention relate to a centralized managing system 10 and a method for creating, deploying, administering, and managing a plurality of separate and distinct virtual computer networks 12 on a virtualization platform 14, for offering cloud computing services (SaaS).

Figure 2:
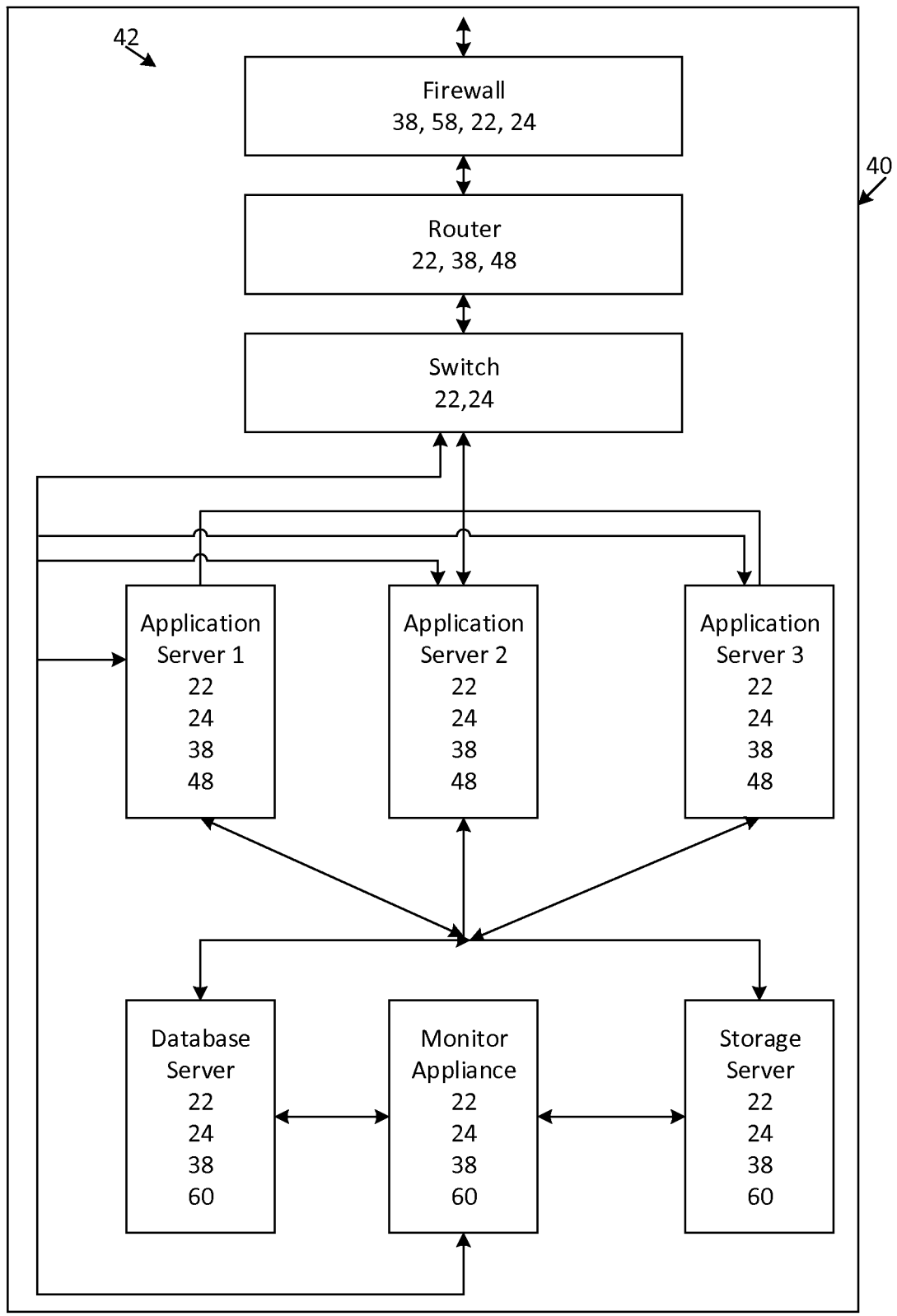
FIG. 2 illustrates a virtual computer network A template.
Figure 3:
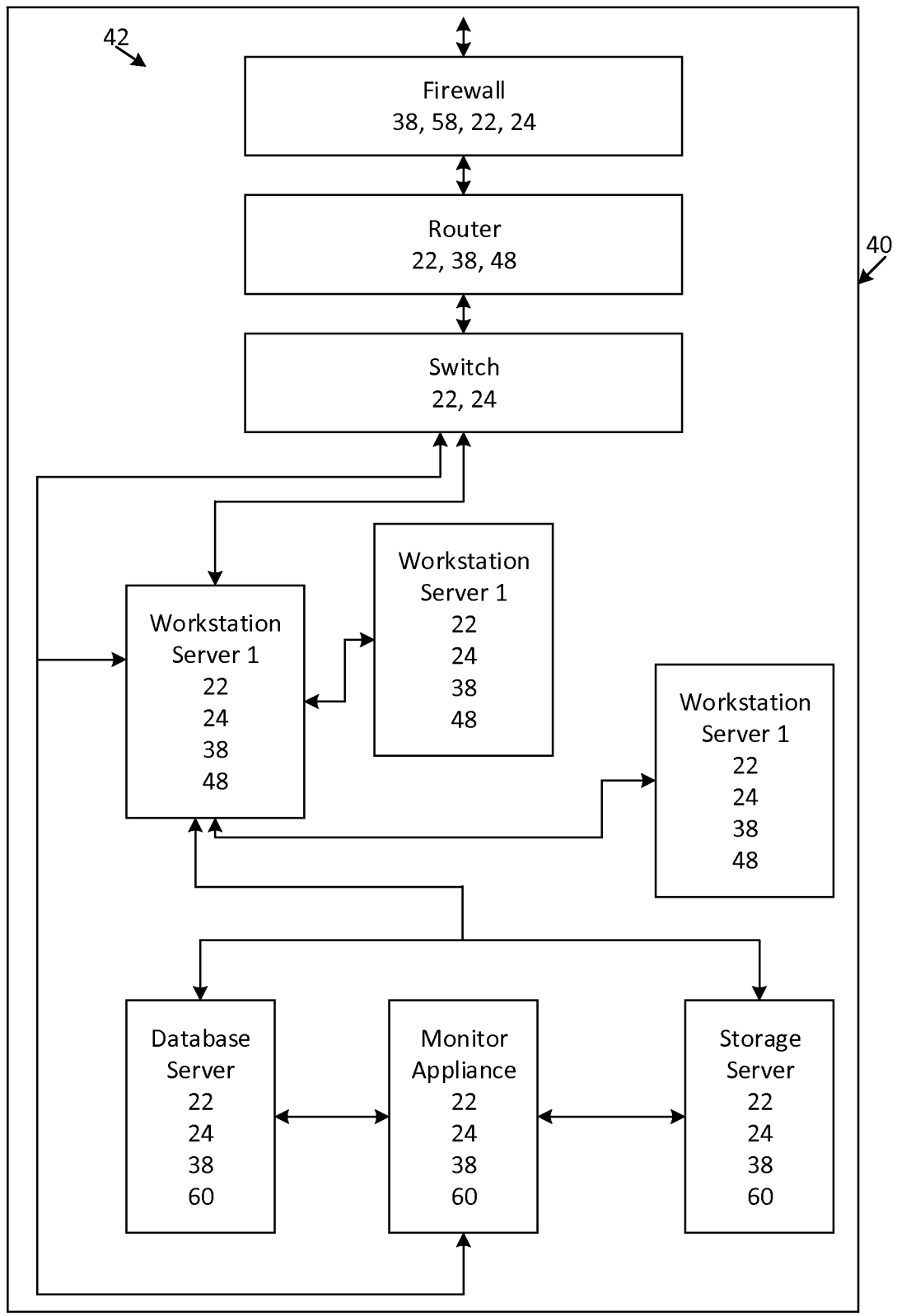
FIG. 3 illustrates a virtual computer network B template.

Referring to FIGS. 1, 2, and 3, an embodiment of the invention is comprised of a grid access security layer 18; a virtual computer network template system 20; a plurality of separate and distinct virtual computer networks 12, comprising a plurality of virtual computer network subcomponents 22 hosted on a plurality of specially designed virtual machines 24; a plurality of resource distribution tools 28, a plurality of monitoring and metering tools 30, a virtualization platform 14, comprising an abstraction layer 32; and a computer data grid 34. The grid includes at least one grid processor and memory device 13.

Figure 4:
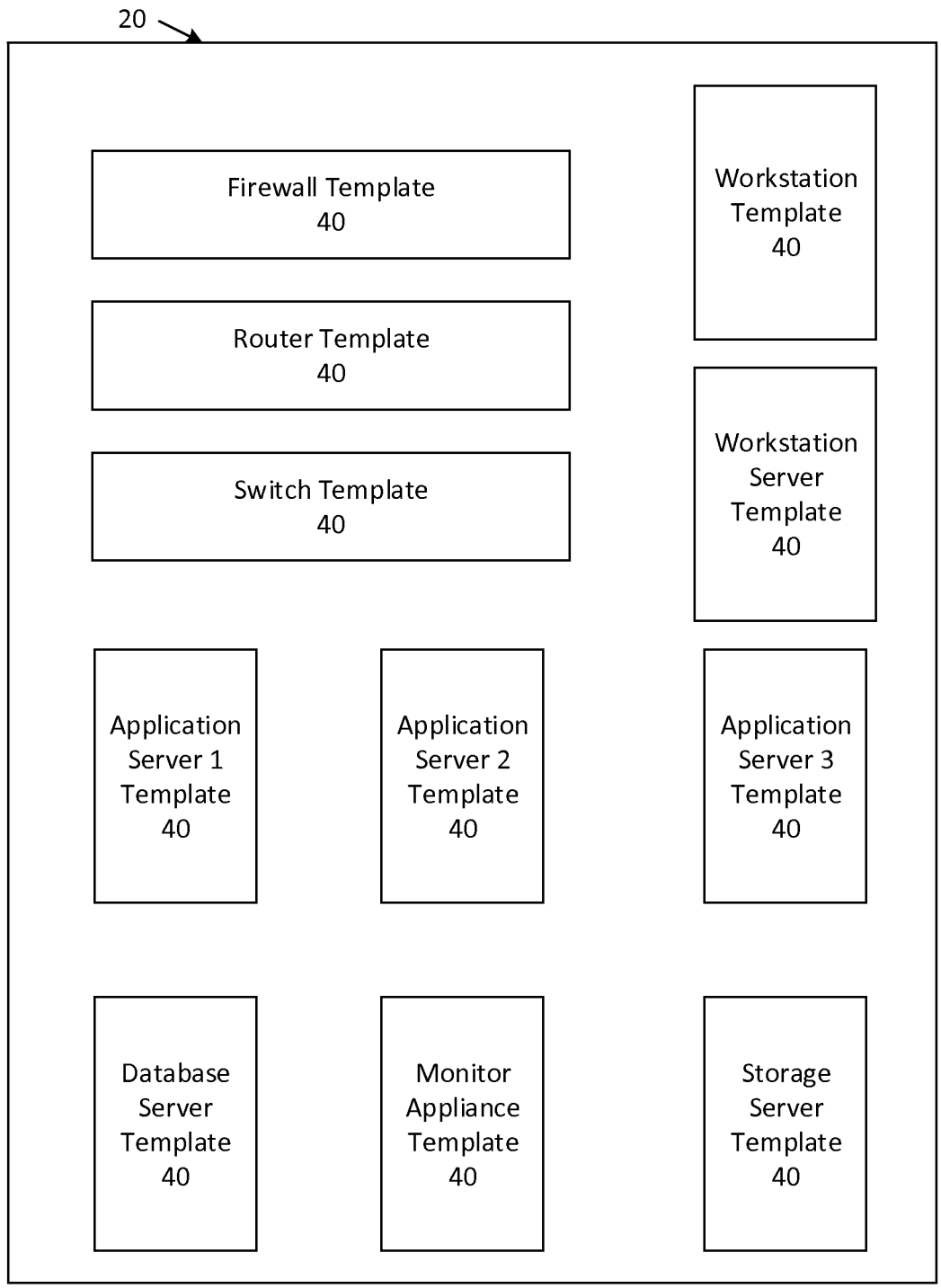
FIG. 4 illustrates virtual subcomponent templates.

Referring to FIGS. 1, 2, 3 and 4, an embodiment of the invention improves the manner in which cloud computing resources are provisioned and managed. The virtual computer network template system 20 (shown on FIG. 1) allows a SaaS provider to assemble cloned instances 38 (shown on FIG. 2 and FIG. 3) of virtual computer network subcomponents 22 (shown on FIGS. 2 and 3), derived from virtual computer network subcomponent templates 40 (as shown in FIG. 4), which are then grouped into separate and distinct virtual computer networks subcomponent templates 42 (shown on FIG. 2 and FIG. 3). Separate and distinct virtual computer networks templates 42 can then be cloned into instances 44 (as shown in FIG. 1), which are added to the plurality of separate and distinct virtual computer networks 12 (shown on FIG. 1). Virtual computer network subcomponents 22, templates 40 (as shown in FIG. 4) or cloned instances 44 (as shown in FIG. 1), may reside on specially designed virtual machines 24, which have been configured to have their "soft points" stored in a separate storage medium isolated from the corresponding virtual machine 24 (as shown in FIG. 2 and FIG. 3). Soft points are data, which are unique to each individual virtual computer network subcomponent 22, template 40 or cloned instances 44, and/or the underlying specially designed virtual machine 24 they reside on. Hard points are data, which are common across one or more virtual computer network subcomponents 22, template 40 or cloned instance 44, and/or the specially designed virtual machines 24 they reside on. By isolating the soft points, changes can be made to the hard points inside a separate and distinct virtual computer network template 42 or a virtual computer network subcomponent template 40, and then pushed to the corresponding cloned separate and distinct virtual computer network instances 44 and cloned virtual network subcomponent instances 48 (as shown in FIG. 2 and FIG. 3) within the plurality of separate and distinct virtual computer networks 12. Thus, the virtual computer network template system 20 greatly simplifies provisioning, administering, and maintaining a plurality of distinct and separate virtual computer network 12 as the SaaS provider need only modify subcomponents templates 40 or network templates 42 and then push the changes to the cloned virtual network subcomponent instances 48 (shown on FIG. 2 and FIG. 3) or virtual network cloned instances 44.

Referring to FIGS. 2 and 3, in an embodiment of the invention, the specially designed virtual machines 24 use a configuration file, or similar instruction set, to locate and load their soft points.

Referring to FIGS. 1 and 4, in an embodiment of the invention, the plurality of virtual computer network subcomponents templates 40 (shown on FIG. 4) may include such items as gateway appliances, firewalls, routers, switches, applications servers, database servers, storage devices, and other network devices. The plurality of separate and distinct virtual computer networks 12 is assembled on the virtualization platform 14 that resides on the computer data grid 34. The computer data grid 34 features an abstraction layer 32 for making the grid's 34 resources available to the plurality of resource distribution tools 28, which can then distribute the grid's 34 resources among the plurality of virtual computer networks 12. The abstraction layer 32 also facilitates the creation, networking, and resource redundancy of the plurality of the specially designed virtual machines 24. Individual specially designed virtual machines 24, within the plurality of specially designed virtual machines 24, are configured specifically for use in the plurality of separate and distinct virtual computer networks 12.

In an embodiment of the invention, the soft points include, but are not limited to, internal grid network address, external network address, disk volumes, databases, memory, CPUs, etc.

Referring to FIGS. 1 and 4, in an embodiment of the invention, each separate and distinct virtual computer network 12, contained within the plurality of separate and distinct virtual computer networks 12 are substantially identical in overall design due to the isolation of the soft points of the virtual machines 24. Such substantial uniformity allows the virtual computer network template system 20 to substantially model one or more separate and distinct virtual computer networks 12, within the plurality of separate and distinct computer networks 12. Such substantial modeling allows system patches, software updates, or other modifications made to any virtual network subcomponent template 40 (shown in FIG. 4) residing on a specially designed virtual machine 24, within the plurality of specially designed virtual machines 24.

Referring to FIGS. 1, 2 and 3, regarding an embodiment of the invention, the virtual network templates 42 (shown in FIG. 2 and FIG. 3) are capable of being isolated from their corresponding, one or more, cloned separate and distinct virtual networks instances 48 (shown on FIGS. 1, 2, and 3), within the plurality of separate and distinct virtual computer networks 12, so that the virtual computer network templates 42 have no effect on the operations or configurations of the corresponding cloned separate and distinct virtual computer networks instances 48. This allows the virtual computer network templates 42 to be subjected to any variety of testing (load testing, compatibility, resource requirements, etc.) in order to determine satisfactory performance. When ready, the modification to the virtual computer network templates 42 can be duplicated and distributed to each of its corresponding separate and distinct virtual computer networks cloned instances 44 (shown on FIG. 1), within the plurality of separate and distinct computer networks 12. The modified individual separate and distinct virtual computer network cloned instances 44, within the plurality of separate and distinct virtual computer networks 12, and the plurality of specially designed virtual machines 24 (shown on FIGS. 1, 2, and 3) that host the virtual computer network subcomponents 22 (FIG. 2 and FIG. 3) of said separate and distinct virtual computer networks 12, within the plurality of separate and distinct virtual computer networks 12, retain their dedicated soft points due to the isolation of said soft points in a data store separated from, and outside of, the plurality of specially designed virtual machines 24. In a similar fashion, new specially designed machines 24 can be integrated into a virtual computer network template 42, providing additional applications or services, without having to rebuild each separate and distinct virtual computer network 12 independently. This use of the virtual computer network template system 20 (shown on FIG. 1) greatly eases and simplifies the complexity usually required for managing disparate machines and networks. As such, programming time and SaaS provider resources can be dedicated to ensure that the various applications can be modified to work together. SaaS provider management is freed from maintaining each network's integration separately, or depending on third-party applications for these connections.

Referring to FIGS. 1, 2, 3, and 4, in an embodiment of the invention, the separate and distinct virtual computer network 12 (shown in FIG. 1), within the plurality of separate and distinct computer networks 12, can be comprised of a nearly limitless array of applications and devices, as opposed to only individual applications and devices provided by traditional methods. The SaaS provider can create as many virtual computer network templates 42 (shown in FIG. 2 and FIG. 3), separate and distinct virtual network cloned instances 44 (shown in FIG. 1), virtual computer network subcomponent templates 40 (shown in FIG. 4) and virtual computer network subcomponent template instances 48 (shown in FIGS. 1, 2, and 3) as the underlying computer grid's 34 resources can support.

Referring to FIGS. 1, 2, and 3, in an embodiment of the invention, the plurality of software tools 30 (shown on FIG. 1) provide for monitoring and metering of the plurality of the separate and distinct virtual computer networks 12 (shown on FIG. 1), both within each individual network 12 and between the grid access security layer 18 (shown on FIG. 1) and the firewalls 58 (shown on FIG. 2 and FIG. 3) of the plurality of separate and distinct virtual computer networks 12, in order to ensure uptime, determine resource usage on a granular level, and other monitoring and metering functions.

Referring to FIGS. 1, 2, and 3, in an embodiment of the invention, each separate and distinct virtual computer network 12 (shown on FIG. 1), within the plurality of separate and distinct computer networks 12, will each include multiple virtual servers 60 (shown on FIG. 2 and FIG. 3) that are integrated to share relevant data (such as a database of business clients), in order to offer the clients/users of an SaaS provider an array of SaaS applications, as opposed to traditional SaaS delivery systems.

Referring to FIG. 1, in an embodiment of the invention, the plurality of software tools 30 facilitate the redistribution of the computer grid's 34 resources to each separate and distinct virtual computer network 12, within the plurality of separate and distinct virtual computer networks 12, including granular control of the resources available to each separate and distinct virtual computer network's 12 virtual computer network subcomponents 48.

Referring to FIGS. 1, 2, and 3, in an embodiment of the invention, an additional layer of security is provided by limiting the overall externally accessible attack surface of each separate and distinct virtual computer network 12 (shown in FIG. 1), within the plurality of separate and distinct virtual computer networks 12. Additionally, each separate and distinct virtual computer network 12, within the plurality of separate and distinct virtual computer networks 12, has its own unique network interface 62 (shown in FIG. 1) that is separate from all other separate and distinct virtual computer networks 12, within the plurality of separate and distinct virtual computer networks 12. Each separate and distinct virtual computer network 12, within the plurality of separate and distinct virtual computer networks 12, operates primarily within the virtualization platform 14, using dedicated private internal network addressing that is isolated from computer networks external to the grid access security layer 18. For external network access, however, each separate and distinct virtual computer network 12, within the plurality of separate and distinct virtual computer networks 12, is provided with unique dedicated public network addresses, each behind individual dedicated firewalls 58 (as shown in FIG. 2 and FIG. 3) that limit the protocols, interfaces, and network surfaces available. The individual dedicated firewalls 58 lie behind an overarching firewall 64 (shown in FIG. 1), residing in the grid security access layer 18 (shown in FIG. 1), that governs all traffic between the individual firewalls 58 and computer networks external to the grid access security layer 18. Such a configuration of multiple firewalls provides an additional layer of protection to the integrity of each separate and distinct virtual computer network 12, within the plurality of separate and distinct virtual computer networks 12. Should any separate and distinct virtual computer network 12, within the plurality of separate and distinct virtual computer networks 12 experience a breach, suffer a denial-of-service attack, or similar hostile act, only that separate and distinct virtual computer network 12, within the plurality of separate and distinct virtual computer networks 12 would suffer, while all the other separate and distinct virtual computer network 12, within the plurality of separate and distinct virtual computer networks 12 would remain unaffected.

Referring to FIG. 1 and FIG. 4, in an embodiment of the invention, the virtualization platform 14 (shown in FIG. 1) allows for the ability to combine virtual subcomponent templates 40 (shown in FIG. 4) in order to create new applications. The virtualization platform 14 allows for the ability to make these applications upgradeable, by creating new virtual network subcomponent templates 40 and propagating the network subcomponent templates 40 throughout the plurality of separate and distinct virtual networks 12 (shown in FIG. 1). For example, when replacing a virtual gateway appliance with a new virtual gateway appliance, the virtualization platform 14 allows for the ability to assign and distribute grid physical resources (RAM, CPU, cores, disk space, etc.) to applications and the underlying virtual network subcomponent template instances 48 (shown in FIGS. 1, 2, and 3) on a granular level, including within otherwise identical applications and appliances, without affecting the other otherwise identical applications or appliances. The virtualization platform 14 provides the ability to start and stop the virtual network subcomponent network template instances 48. The virtualization platform 14 provides the ability to monitor the virtual network subcomponent network template instances 48 and applications' status and to apportion grid 34 resources (including IP addresses) to the virtual network subcomponent network template instances 48 and applications.

Referring to FIGS. 1, 2, and 3, in an embodiment of the invention, hardware resources of the grid 34 (shown in FIG. 1) provide physical redundancy to the virtual network subcomponent network template instances 48 (shown in FIGS. 1, 2, and 3) and applications, allowing for high availability.

Other aspects of the invention of the invention include a computerized method and a non-transitory computer-readable medium having instructions stored thereon, the instructions configured to adapt an at least one grid processor to perform the method for providing a centralized managing system for creating, deploying, administering, and managing a plurality of separate and distinct virtual networks on a virtualization platform.

Benefits include ease of administering SaaS services, increase security for client, and increase flexibility in general.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A computer system for managing a plurality of separate and distinct virtual computer networks, comprising:
   at least one processor; and
   a memory device that stores a managing application that adapts the at least one processor to:
   create the plurality of separate and distinct virtual computer networks, with at least two having different topologies, using a virtual computer network template system including a plurality of virtual computer network subcomponents and virtual computer network subcomponent templates, wherein each of the created separate and distinct virtual computer networks is assembled from templated instances of the virtual computer network subcomponents that are grouped into corresponding virtual computer network templates, each of the separate and distinct virtual computer networks having at least one specially designed virtual machine, wherein the specially designed virtual machine is configured from corresponding virtual computer network subcomponents, virtual computer network subcomponent templates, or cloned instances of the virtual computer network subcomponent templates, wherein each specially designed virtual machine includes:

a plurality of unique soft points specific to the specially designed virtual machine, wherein the soft points include data unique to each individual virtual computer network subcomponent, virtual computer network subcomponent template, or cloned instance of the virtual computer network subcomponent templates that is stored for the specially designed virtual machine that allows each to exist separately and independently from any other instance of that subcomponent used in the plurality of virtual computer networks, wherein each specially designed virtual machine is configured to have its soft points stored in a storage medium apart from the specially designed virtual machine for protecting the uniqueness of the soft points; and a plurality of hard points that includes data common between at least two specially designed virtual machines, wherein the hard points includes data common across one or more virtual computer network components, virtual computer network subcomponents, virtual computer network subcomponent templates, or cloned instance of the virtual computer network subcomponent templates and/or the specially designed virtual machine, wherein each specially designed virtual machine is configured to have its hard points stored in a storage medium apart from the specially designed virtual machine, wherein the hard points are separated and isolated from the soft points;

wherein the managing application further adapts the at least one processor to:

make a modification to a virtual computer network subcomponent template;

push the modification of the virtual computer network subcomponent template to at least one virtual computer network subcomponent of the plurality of virtual computer subcomponents, wherein the virtual computer network subcomponents of a first separate and distinct virtual computer network of the plurality are not codependent with the virtual computer network subcomponents of a second separate and distinct virtual computer network of the plurality, wherein a modification to a virtual computer network subcomponent template need not be pushed to every corresponding virtualized computer network subcomponent in the plurality of virtual computer networks, allowing the virtual computer network subcomponents of the plurality of virtual computer networks to evolve separately and independently of any other instance where corresponding virtual computer network subcomponents are used; and make the modification to the at least one virtual network subcomponent of the plurality of virtual computer networks without affecting either the uniqueness of the soft points or the hard points, wherein the modification is made to an instance of the at least one virtual network subcomponent of the virtual computer network without interfering with any of the instances of the other virtual network subcomponents.

2. The computer system of claim 1, wherein at least one virtual computer network subcomponent of the plurality can be modified independently from the virtual computer network subcomponent template it is based at least in part on.

3. The computer system of claim 1, wherein the managing application further adapts the at least one processor to provide a grid access security layer.

4. The computer system of claim 1, wherein the managing application further adapts the at least one processor to provide a virtualization platform for hosting the specially designed virtual machines.

5. The computer system of claim 1, wherein the managing application further adapts the at least one processor to provide at least one software tool that monitors the plurality of separate and distinct virtual computer networks.

6. The computer system of claim 1, wherein the managing application further adapts the at least one processor to provide at least one software tool that meters the plurality of separate and distinct virtual computer networks.

7. A method of managing a plurality of separate and distinct virtual computer networks comprising:

creating, via at least one processor adapted by a managing application stored in a memory device, the plurality of separate and distinct virtual computer networks, with at least two having different topologies, using a virtual computer network template system including a plurality of virtual computer network subcomponents and virtual computer network subcomponent templates, wherein each of the created separate and distinct virtual computer networks is assembled from templated instances of the virtual computer network subcomponents that are grouped into corresponding virtual computer network templates, each of the separate and distinct virtual computer networks having at least one specially designed virtual machine, wherein the specially designed virtual machine is configured from corresponding virtual computer network subcomponents, virtual computer network subcomponent templates, or cloned instances of the virtual computer network subcomponent templates, wherein each specially designed virtual machine includes:

a plurality of unique soft points specific to the specially designed virtual machine, wherein the soft points include data unique to each individual virtual computer network subcomponent, virtual computer network subcomponent template, or cloned instance of the virtual computer network subcomponent templates that is stored for the specially designed virtual machine that allows each to exist separately and independently from any other instance of that subcomponent used in the plurality of virtual computer networks, wherein each specially designed virtual machine is configured to have its soft points stored in a storage medium apart from the specially designed virtual machine for protecting the uniqueness of the soft points; and a plurality of hard points that includes data common between at least two specially designed virtual machines, wherein the hard points includes data common across one or more virtual computer network components, virtual computer network subcomponents, virtual computer network subcomponent templates, or cloned instance of the virtual computer network subcomponent templates and/or the specially designed virtual machine, wherein each specially designed virtual machine is configured to have its hard points stored in a storage medium apart from the specially designed virtual machine, wherein the hard points are separated and isolated from the soft points;

wherein the further method comprises:

making, via the at least one processor adapted by the managing application, a modification to at least one virtual computer network subcomponent template;

pushing, via the at least one processor adapted by the managing application, the modification of the virtual computer network subcomponent template to at least one virtual computer network subcomponent of the plurality of virtual computer subcomponents, wherein the virtual computer network subcomponents of a first separate and distinct virtual computer network of the plurality are not codependent with the virtual computer network subcomponents of a second separate and distinct virtual computer network of the plurality, wherein a modification to a virtual computer network subcomponent template need not be pushed to every corresponding virtualized computer network subcomponent in the plurality of virtual computer networks, allowing the virtual computer network subcomponents of the plurality of virtual computer networks to evolve separately and independently of any other instance where corresponding virtual computer network subcomponents are used; and making the modification to the at least one virtual network subcomponent of the plurality of virtual computer networks without affecting either the uniqueness of the soft points or the hard points, wherein the modification is made to an instance of the at least one virtual network subcomponent of the virtual computer network without interfering with any of the instances of the other virtual network subcomponents.

8. The method of claim 7, wherein at least one virtual computer network subcomponent of the plurality can be modified independently from the virtual computer network subcomponent template it is based at least in part on.

9. The method of claim 7, further comprising:
providing, via the at least one processor adapted by the managing application, a grid access security layer.

10. The method of claim 7, further comprising:
providing, via the at least one processor adapted by the managing application, a virtualization platform; and
hosting the specially designed virtual machines on the virtualization platform.

11. The method of claim 7, further comprising:
monitoring the plurality of separate and distinct virtual computer networks via at least one software tool provided by the at least one processor adapted by the managing application.

12. The method of claim 7, further comprising:
metering the plurality of separate and distinct virtual computer networks via at least one software tool provided by the at least one processor adapted by the managing application.

13. A non-transitory computer readable medium storing instructions that adapt at least one processor to:

create a plurality of separate and distinct virtual computer networks, with at least two having different topologies, using a virtual computer network template system including a plurality of virtual computer network subcomponents and virtual computer network subcomponent templates, wherein each of the created separate and distinct virtual computer networks is assembled from templated instances of the virtual computer network subcomponents that are grouped into corresponding virtual computer network templates, each of the separate and distinct virtual computer networks having at least one specially designed virtual machine, wherein the specially designed virtual machine is configured from corresponding virtual computer network subcomponents, virtual computer network subcomponent templates, or cloned instances of the virtual computer network subcomponent templates, wherein each specially designed virtual machine includes:

a plurality of unique soft points specific to the specially designed virtual machine, wherein the soft points include data unique to each individual virtual computer network subcomponent, virtual computer network subcomponent template, or cloned instance of the virtual computer network subcomponent templates that is stored for the specially designed virtual machine that allows each to exist separately and independently from any other instance of that subcomponent used in the plurality of virtual computer networks, wherein each specially designed virtual machine is configured to have its soft points stored in a storage medium apart from the specially designed virtual machine for protecting the uniqueness of the soft points; and a plurality of hard points that includes data common between at least two specially designed virtual machines, wherein the hard points includes data common across one or more virtual computer network components, virtual computer network subcomponents, virtual computer network subcomponent templates, or cloned instance of the virtual computer network subcomponent templates and/or the specially designed virtual machine, wherein each specially designed virtual machine is configured to have its hard points stored in a storage medium apart from the specially designed virtual machine, wherein the hard points are separated and isolated from the soft points;

make a modification to at least one virtual subcomponent template;

push the modification of the virtual computer network subcomponent template to at least one virtual computer network subcomponent of the plurality of virtual computer subcomponents, wherein the virtual computer network subcomponents of a first separate and distinct virtual computer network of the plurality are not codependent with the virtual computer network subcomponents of a second separate and distinct virtual computer network of the plurality, wherein a modification to a virtual computer network subcomponent template need not be pushed to every corresponding virtualized computer network subcomponent in the plurality of virtual computer networks, allowing the virtual computer network subcomponents of the plurality of virtual computer networks to evolve separately and independently of any other instance where corresponding virtual computer network subcomponents are used; and make the modification to the at least one virtual network subcomponent of the plurality of virtual computer networks without affecting either the uniqueness of the soft points or the hard points, wherein the modification is made to an instance of the at least one virtual network subcomponent of the virtual computer network without interfering with any of the instances of the other virtual network subcomponents.

14. The non-transitory computer readable medium of claim 13, wherein at least one virtual computer network subcomponent of the plurality can be modified independently from the virtual computer network subcomponent template it is based at least in part on.

* * * * *